(12) United States Patent
Wang et al.

(10) Patent No.: US 10,360,246 B2
(45) Date of Patent: Jul. 23, 2019

(54) METHOD, SYSTEM, AND APPARATUS FOR SEARCHING AND DISPLAYING USER GENERATED CONTENT

(71) Applicant: Tencent Technology (Shenzhen) Co., Ltd., Shenzhen, Guangdong (CN)

(72) Inventors: Haibo Wang, Guangdong (CN); Juan Du, Guangdong (CN)

(73) Assignee: TENCENT TECHNOLOGY (SHENZHEN) CO., LTD., Shenzhen (CN)

(*) Notice: Subject to any disclaimer, the term of this patent is extended or adjusted under 35 U.S.C. 154(b) by 1131 days.

(21) Appl. No.: 14/314,604

(22) Filed: Jun. 25, 2014

(65) Prior Publication Data

US 2014/0344671 A1 Nov. 20, 2014

Related U.S. Application Data

(63) Continuation of application No. PCT/CN2014/070058, filed on Jan. 3, 2014.

(30) Foreign Application Priority Data

May 20, 2013 (CN) .......................... 2013 1 0188005

(51) Int. Cl.
*G06F 17/21* (2006.01)
*G06F 16/29* (2019.01)
(Continued)

(52) U.S. Cl.
CPC .......... *G06F 16/29* (2019.01); *G06F 16/9537* (2019.01); *G06F 17/211* (2013.01); *G06F 17/212* (2013.01); *G06T 19/00* (2013.01)

(58) Field of Classification Search
CPC ............... G06F 17/2247; G06F 17/212; G06F 17/30241; G06F 17/3087; G06F 16/29;
(Continued)

(56) References Cited

U.S. PATENT DOCUMENTS 6,072,489 A * 6/2000 Gough .................. G06F 3/0481
715/803
7,337,389 B1 * 2/2008 Woolf .................... G06F 17/241
345/629

(Continued)

FOREIGN PATENT DOCUMENTS

CN 101583016 A 11/2009
CN 102694829 A 9/2012
(Continued)

OTHER PUBLICATIONS

Office Action dated Apr. 12, 2017 for Chinese Application No. 201310188005.7, 7 pages.
(Continued)

*Primary Examiner* — Thu V Huynh
(74) *Attorney, Agent, or Firm* — Brinks Gilson & Lione

(57) ABSTRACT

The present disclosure discloses a method, system and apparatus for searching and displaying user generated content. The method includes displaying a street view on a browser of a user's terminal, determining a geographical range within which the street view lies, wherein the geographical range comprises geographical location information of the street view and a surrounding area covered within a predefined range measured from the geographical location information of the street view, determining a plurality of UGC which have been posted within the geographical range; and displaying on the browser, the plurality of UGC posted within the geographical range of the street view.

19 Claims, 4 Drawing Sheets

(51) Int. Cl.
*G06T 19/00* (2011.01)
*G06F 16/9537* (2019.01)

(58) Field of Classification Search
CPC .... G06F 16/9537; G06F 16/211; G06T 19/00; G06T 11/60
See application file for complete search history.

(56) References Cited

U.S. PATENT DOCUMENTS

| | | | |
|---|---|---|---|
| 8,352,183 B2 | 1/2013 | Thota et al. | |
| 8,818,031 B1* | 8/2014 | Kelly | G06K 9/00671 382/103 |
| 2004/0030678 A1* | 2/2004 | Tu | G06F 7/22 |
| 2009/0012955 A1* | 1/2009 | Chu | G06Q 30/0261 |
| 2009/0060263 A1* | 3/2009 | Tsutsui | G06K 9/00476 382/100 |
| 2009/0109216 A1* | 4/2009 | Uetabira | G06F 17/30905 345/419 |
| 2009/0119009 A1* | 5/2009 | Dicke | G01C 21/30 701/533 |
| 2010/0124991 A1 | 5/2010 | O'Sullivan et al. | |
| 2010/0146436 A1* | 6/2010 | Jakobson | G01C 21/3682 715/800 |
| 2011/0173565 A1* | 7/2011 | Ofek | G09B 29/00 715/790 |
| 2012/0218296 A1* | 8/2012 | Belimpasakis | G06Q 30/0261 345/633 |
| 2013/0093787 A1* | 4/2013 | Fulks | G06T 11/60 345/629 |
| 2014/0068444 A1* | 3/2014 | Arrasvuori | G06F 17/3087 715/733 |
| 2014/0244165 A1* | 8/2014 | Bells | G01C 21/367 701/455 |
| 2016/0019704 A1* | 1/2016 | Liu | G01C 21/3602 345/619 |

FOREIGN PATENT DOCUMENTS

| | | |
|---|---|---|
| CN | 102695120 A | 9/2012 |
| WO | WO2010065032 A1 | 6/2010 |

OTHER PUBLICATIONS

International Preliminary Report on Patentability and Written Opinion received in PCT Application No. PCT/CN2014/070058 dated Nov. 24, 2015.
International Search Report received in PCT Application No. PCT/CN2014/070058 dated Apr. 3, 2014.

* cited by examiner

METHOD, SYSTEM, AND APPARATUS FOR SEARCHING AND DISPLAYING USER GENERATED CONTENT

CROSS-REFERENCE TO RELATED APPLICATIONS

The application is a continuation of PCT Application No. PCT/CN2014/070058, filed on Jan. 3, 2014, which claims priority to Chinese Patent Application No. 2013101880057, filed on May 20, 2013, which is incorporated by reference in their entireties.

FIELD OF THE TECHNOLOGY

The present disclosure relates to the technical field of the Internet, and particularly to a method, a system and apparatus for searching and displaying User Generated Content (UGC) on a browser of a mobile terminal.

BACKGROUND

User Generated Content (UGC) refers to the contents which have been generated and posted or posted to the public by a user on the Internet. At present, such contents may be in the form of text, videos and audio contents, and posted through micro-blogs, comments, logs, photos, music and videos which have been posted in various social networks worldwide and in various countries. Some of those better known social networks may include, but not limited to Facebook, Twitter, Fanbox, Google share, Myspace, Youtube, Yelp, Qzone, Weibo, Weiboke, just to name a few.

Along with the development of technologies in high speed internet networks, availability of mass memory storage with database management and user friendly procedure to post content on the social network website, UGC has become a popular tool to connect and communicate with the mass population worldwide. The volume of UGC posted on the internet has sharply increased.

At present, the default practice in the industry in terms of how to display UGC is: displaying a list of UGC according to chronological order—the posting time in a journal or archive format.

Take micro-blog as an example: micro-blogs that need to be displayed may first be formed into a list of micro-blogs with the latest or most recent posted micro-blog being placed on the top, and the earliest posted microblog being arranged at the bottom. Besides, the micro-blogs that need to be displayed have to be displayed through displaying the list of micro-blogs first, which may include all the micro-blogs posted in proximal to the current position of the user.

In addition, the present method of searching through UGC seems to start with searching from the most recent display on the list of UGC at a display interface, which may not be of immediate interest to the user. In this regard, the method of displaying the UGC affects how the UGC is being searched. Accordingly, the present display method does not provide a sufficiently direct way to search and view the contents of interest, such as graphics content, posting time or posting location, etc. Instead, the search of the UGC needs to be performed by way of reading one by one down the list, which is somewhat inefficient and slow.

SUMMARY

The embodiments of the present disclosure disclose a method, system and apparatus for searching and displaying User Generated Content (UGC), and the present disclosure may improve the efficiency of searching and displaying UGC on a user's browser.

In an aspect, the embodiments of the present disclosure disclose a method for searching and displaying User Generated Content (UGC). The method may include: displaying on a browser of a user's terminal, a street view; determining a geographical range within which the street view lies, wherein the geographical range comprises geographical location information of the street view and a surrounding area covered within a predefined range measured from the geographical location information of the street view; determining a plurality of UGC which have been posted within the geographical range; and displaying on the browser, the plurality of UGC posted within the geographical range which pertains to the displayed street view of the street view.

In another aspect, the embodiments of the present disclosure disclose a user generated content (UGC) searching and displaying apparatus, and the apparatus may include: at least a processor operating in conjunction with at least a memory which stores instruction codes operable as plurality of modules, wherein the plurality of modules include: a street view displaying module, a UGC determining module and a UGC displaying module, wherein: the street view displaying module displays on a browser of a user's terminal, a street view; the UGC determining module determines a geographical range within which the street view lies, and determines a plurality of UGC which have been posted within the geographical range information of UGC, wherein the geographical range comprises geographical location information of the street view and a surrounding area covered within a predefined range measured from the geographical location information of the street view; the UGC displaying module displays on the browser, the plurality of UGC posted within the geographical range of the street view.

The implementation of the present disclosure may enable a user such as a visitor at a present location who finds one or more point of interest (POI) at the street view may quickly search and access through a terminal browser, the posted UGC pertaining to each of the POI at the street view, or the posted UGC in the vicinity of street view.

The term "street view" in the disclosure may represent any view both indoor and outdoor without limitations. For example, a "street view" of an indoor setting may be view of a decoration, a store item, a menu or a food dish, a person, an art piece, a picture or a photograph of another view. A "street view" of an outdoor setting may be a view of a street, an aerial view of a landscape, a city landmark, a building, a billboard, a street sign, a storefront, a traffic view on the road or an object with a street view as a background.

Furthermore, the "street view" may be obtained in real time using a camera or video function of a user terminal. Alternately, the "street view" may be obtained through an archive database as stored images or as a stored video. The "street view" may be obtained locally or obtained remotely through live broadcast, webcast or obtained through third party's image acquisition devices, so long as the "street view" may be made available to be displayed on a browser of a user's terminal.

The term "user terminal" refers in general to a computing device with network connection capabilities to browse websites on the internet. For example, the user terminal may be a smart phone, a mobile computing tablet, a communication eyepiece, a laptop computer, a notebook computer, a desk top computer or any terminal that connects to a server to access the internet.

The disclosures enable a user to spot at least one point of interest (POI) (on-site or remotely) which is situated at a geographical location, to speedily query, search and display the relevant UGC directly related to the POI at the street view, or search and display the UGC posted from a specified range measured from the location of the street view.

The disclosure may also implement filtering rules to filter out contents, categorizing UGC and display the filtered UGC pertaining to categories of interests, such as following certain favorite authors, time periods, micro blogs of positive comments, negative comments or offered promotions, etc. Therefore, by means of viewing the UGC in the street view, not only may the UCG post location origin may be acquired quickly, but also other details such as the author, time and subject matter of the posted UGC may also be known through a filtering and search function.

A user's search time in displaying or browsing relevant UGC may be reduced by simply performing a plain sight search for each POI at the street view. The various disclosures may find applications in advertising industry to promote products and services, improves customer service with rating scale information, educate tourists, promote communities social awareness and increase social networking traffics.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims and may not be construed in a limited sense.

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, the newly added features, or features that are different from those previously described in each new embodiment will be described in details. Similar features will be referenced back to the prior descriptions.

In order to clarify the objective, technical scheme and advantages of the present disclosure more specifically, the present disclosure is illustrated in further details with the accompanied drawings and embodiments. It should be understood that the embodiments described herein are merely examples to illustrate the present disclosure without limitations to their scope.

Figure 1:
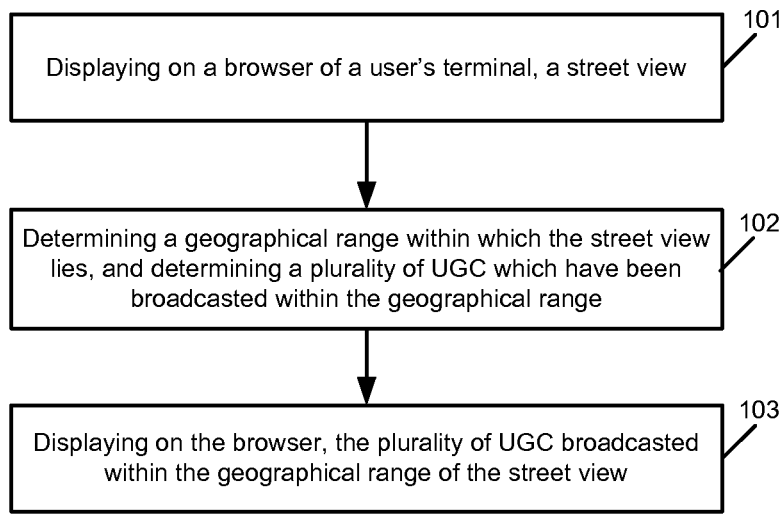
FIG. 1 is an exemplary flow diagram illustrating a method for searching and displaying user generated content (UGC), according to an embodiment of the present disclosure.

FIG. 1 is an exemplary flow diagram illustrating a method for searching and displaying user generated content (UGC), according to an embodiment of the present disclosure. As shown in FIG. 1, the flow diagram may include the following exemplary steps:

Step 101: displaying on a browser of a user's terminal, a street view. The displayed street view on a browser generally provides a two dimensional view (i.e., in horizontal direction and in vertical direction) of different objects that may be seen on the street at a ground level. The street view is a forward view from a user's perspective, but the street view may be also panned to view multiple angles (up to 360 degrees) and at different inclined angles for different objects or different point of interests (POI).

Step 102: In this step, the user's terminal which displays the street view may first determine a geographical range within which the street view lies. The geographical range includes geographical location information of the street view and a surrounding area covered within a predefined range measured from the geographical location information of the street view. For example, the geographical location information may be location information received through a GPS receiver, such as the longitude and latitude readings of the street view.

The user's terminal then transmits a query request through the internet to a UGC server. The query request may carry the geographical range information, which may include the geographical location information and a predefined range measured from the geographical location of the street view as an origin or a center. The UGC server may rely on the received geographical range data to retrieve from a UGC database, a plurality of posted UGC which may match the geographical range data and returns the plurality of UGC to the user's terminal.

Step 103: displaying on the browser, the plurality of UGC posted within the geographic range. In this step, the user's terminal may display the received plurality of UGC from the UGC server, and display the plurality of UGC which have been posted within the geographical range of the street view.

Figure 2:
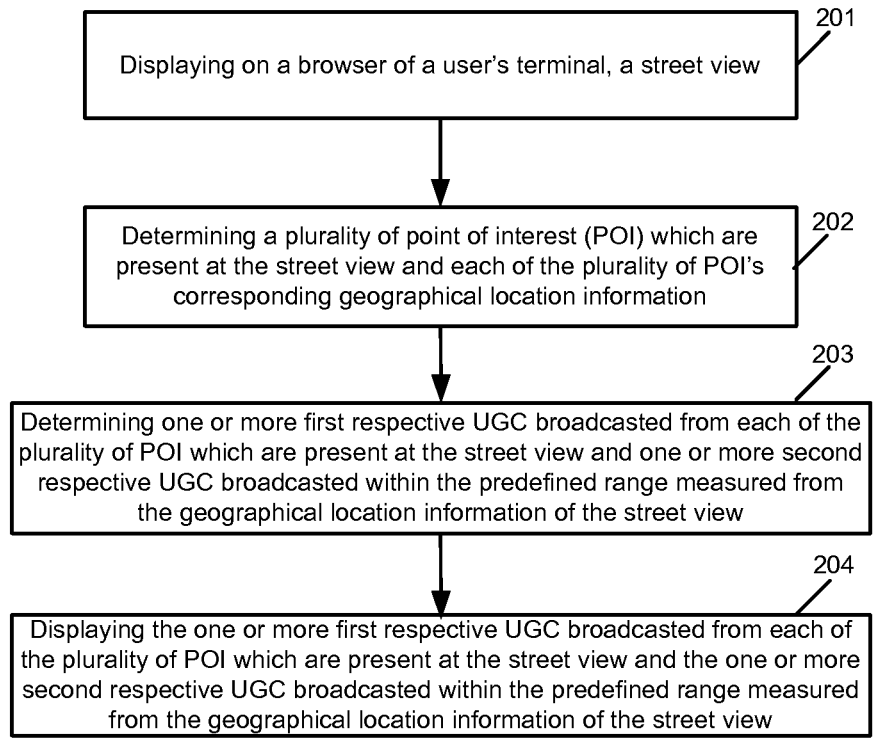
FIG. 2 is an exemplary flow diagram illustrating another method for searching and displaying user generated content (UGC), according to an embodiment of the present disclosure.

FIG. 2 is an exemplary flow diagram illustrating another method for searching and displaying user generated content (UGC), according to an embodiment of the present disclosure. The exemplary steps may include:

Step 201: displaying on a browser of a user's terminal, a street view. This step is similar to step 101 in FIG. 1.

Step 202: determining a plurality of point of interest (POI) which are present at the street view and each of the plurality of POI's corresponding geographical location information. This step is similar to step 102 in FIG. 2, except that the user may identify some specific point of interest (POI) seen on the street view that he or she may like to know more about through the UGC posted by other people.

For example, a user may be standing in front of a restaurant on a certain street. The user may like to find out if there are any recommendations or comments have been posted regarding the food, service or complaints about a particular restaurant before going in. The user may use the camera function of his smart phone to snap a picture of the street view, and identify the restaurant through the picture (alternately through the restaurant's name, if known) as a point of interest (POI) to receive UGC posted by customers who had visited the restaurant.

The user may wish to receive UGC posted about other neighboring restaurants for comparison or recommendations. The user may specify a range, such as 10 meters (10 m), 100 meters (100 m) or 1 kilometer (1 km) as a radius, using an initial POI as a center measurement point to receive GPS readings (i.e., longitude and latitude readings) to identify other similar POI within the specified range. It should be pointed out that the area covered by the range may not necessarily be a circle. The coverage area may be a rectangular area, a square, or any designated blocks within the specified range.

Step 203: determining one or more first respective UGC posted from each of the plurality of POI which are present at the street view and one or more second respective UGC posted within the predefined range measured from the geographical location information of the street view.

Using the same example in step 202 to illustrate step 203, the user may receive through his smart phone browser, all the UGC posted within the predefined geographical range from the first POI, including the UGC posted for other POI in the vicinity.

More specifically, the user's terminal may send a query message with geographical location information (i.e., longitude and latitude readings) of the POI in the street view, including a specified range (e.g., 10 m, 100 m, 1 km) to a UGC server through an internet or WiFi connection. The UGC server may match the geographical location parameters of the specific POI in the street view with a UGC database, to determine if any UGC posted with the same location parameters. If so, the UGC server may return such information to the user's terminal, if none, it would indicate none. If a predefined range from the POI at the street view has been entered by the user, the UGC server may also return all the matched UGC posted in the vicinity within the predefined range, and return such information to the user's terminal.

If the user does not set a filtering parameter to specify what category of information he or she would want to receive, then the received UGC posted would include all the micro blogs, such as personal chats and news comments, favorite music, political debates, food recommendations, movies ratings, etc. which may be burdensome for the user who is looking for comments regarding food quality and service of the restaurant.

The user may therefore, specify in his UGC query message certain filtering parameters, by specifying "restaurants" (i.e., restaurant category). The UGC server may then return all the UGC posted regarding the POI restaurant, and the restaurants in the neighboring POI. The user may further include in the filtering parameters by specifying only the type of food looking for, such as "Chinese food", "Indian food", "Italian food", "Korean food", "Japanese food", or a combination of several types of food. Accordingly, the UGC server may return only the UGC posted regarding the restaurants serving those specific types of food, within the predefined range of 10 m, 100 m, or 1 km measured from the initial POI of the street view.

Step 204: displaying the one or more first respective UGC posted from each of the plurality of POI which are present at the street view and the one or more second respective UGC posted within the predefined range measured from the geographical location information of the street view.

Using the same example described in steps 202-203, the browser of the user's terminal may display the received UGC posted for both the initial POI in the street view, as well as the UGC posted in the vicinity within the specified range from the geographical location information of the street view, which may be the initial POI, if chosen by the user.

If the filtering parameter has been set to specify only the "Chinese food" category, then the browser may display the posted UGC with chats, comments, videos, ratings, recommendations, etc. regarding the Chinese restaurants (i.e., POI) at the street view, and all the relevant UGC posted on other restaurants serving "Chinese food" within the specified range.

As seen in the above embodiment, a corresponding relation between each POI displayed in the street view and the associated UGC posted for the POI may be established. That way, the user may clearly know the posting location of the UGC at a glance without a need of reading any text content of the UGC. In addition, if various UGC proximal to the same POI may be brought together to be displayed, then the other UGC proximal to each POI in the street view may also be acquired at the same time, including the most recent news about the POI, such that the user may acquire the most updated posting with a much faster speed.

In addition, this disclosed method would enable searching for the UGC become more convenient and simple. For example, if a visitor would like to find out as much as he can about what other visitors' experience about a certain street view location (e.g., a bridge view on Michigan Avenue over the Chicago river) he could simply review the related UGC posted for each POI (i.e., the Wrigley building, the Tribune tower, the NBC TV station, the Trump Tower, the Sheraton hotel, the United Artist movie theatre and the restaurants in the area, etc.) within a certain geographical range from the bridge view (e.g., 1 km radius). The user may need to only snap a picture of the bridge view overlooking the Chicago River, send a query specifying the view with 1 km range. The UGC server as a system back-end may automatically match the bridge view, using the GPS reading (longitude and latitude) for the view as the geographical location and display the corresponding UGC to each of the above mentioned POI within the 1 km range. That way, there would be no need to search the UGC directed towards each of the above mentioned POI located within the 1 km range one by one, and the user may elect to perform a fine search by specifying a filtering parameter (e.g., NBC TV show schedule opened to public audience, names of movies being playing in the UA theatre, etc.) A visitor from out of town may choose accordingly his or her next touring itinerary, based on the comments or micro blogs posted in the UGC by other visitors who had been to the TV show or read the ratings of the movies.

In the above method disclosed in FIG. 2, after having determined by the UGC server that the UGC posted in the geographical range do correspond to the street view, the UGC may be categorized or classified according to mutual distance separations among the posting positions of the various UGC within the geographical range of the street view. In this way, UGC having a same category or classification posted within a certain location (e.g., micro blogs posting on a TV show at the NBC TV station) may be grouped together as in a same sub-range within the geographic range (i.e., within the 1 km range) of the bridge view. A sub-range may be an area (i.e., the NBC TV station), which the same category of UGC (e.g., micro blogs or comments on the TV talk show host) may be posted. If the distance separations among the posting positions of the various UGC are relatively far, then the posting position of the UGC may have large sub-range coverage.

It may be seen that through categorizing the various UGC according to the posting locations, this may enable the user to view UGC posting according to their category as well as posting locations in a glance. Such categorization may be useful for UGC filtering operations.

Accordingly, the displaying of the UGC posted within the geographical range may include: sorting the plurality of UGC according to categories and according to mutual distance separations of the plurality of UGC from each other, wherein the mutual distance separations are based on measured distances from the geographical location information of the street view, such that sorted same category of UGC each corresponds to a respective sub-range within the geographical range, and displaying the UGC posted within the geographical range based on a relation corresponding between the sorted same category of UGC and the respective sub-range within the geographical range.

In another embodiment, if the street view is a large prairie with no POI, it may still be feasible to display all the corresponding UGC which have been posted about this prairie within a specified range according to the latitude and longitude of the posting position. If the posting positions of the UGC are relatively close enough to each other, then it may become feasible to group these UGC together to be realized as a single area for purpose of compact display.

Regarding how to determine the geographic range information to which the street view corresponds, a geographic reference position of the street view may be acquired, the predefined range measured from the geographical location information of the street view, according to the information of the geographical reference location and information of a relation between a borderline of a geographical range and the information of the geographical reference location. Based on the information of the geographic reference position, a relation between the borderline of the geographic range and the information of the geographic reference position may be established.

For example, information on images or pictures of several other street views may be used to establish a geographic reference position of the street view at the pending acquisition location using a geometric relationship of a circle. For example, the geographic reference position of the street view at the pending acquisition location may be regarded as being a center of a circle. A respective distance may be measured or determined for each of the other street views as a corresponding radius (i.e., predefined range) from the center (i.e., the street view at the pending acquisition location). In this regard, a geographical range may be determined as being an area covered within the predefined range referenced from the geographic reference position of the street view at the pending acquisition location. The covered area of the geographical range may be shaped as a circle, a sector, a square, a rectangle or an arbitrary shape covering only certain designated blocks.

The acquired geographical location information (i.e., longitude, latitude) of the geographic reference position of the street view at the pending acquisition location as well as the other street views may be stored into the user's terminal for journal archive and for future reference.

Likewise, the geographical location information of the POI (i.e., longitude, latitude) within the geographical range may also be determined using the geographic reference position of the street view at the pending acquisition location.

Regarding how to match the information of the geographic position of the each POI and the posted position information of the UGC so as to determine which UGC which has been posted in the predefined range around each POI, the embodiments of the present disclosure propose that it is feasible to calculate a distance d between the position of the POI and the posting position of the UGC according to a position A of this POI and the posting position B of the UGC. When distance d is less than the predefined range value, the UGC may be determined to be within the predefined range around this POI at position A.

An example may be illustrated in calculating the distance d according to the following formula:

$$d=111.12\cos\{1/[\sin \phi A \sin \phi B + \cos \phi A \cos \phi B \cos (\lambda B - \lambda A)]\},$$

wherein the longitude and latitude of position point A are $\lambda A$ and $\phi A$, respectively; the longitude and latitude of the position point B are $\lambda B$ and $\phi B$, respectively.

In the above embodiments of the present disclosure, besides being feasible to display the UGC which has been posted in the predefined range around the POI in the street view, it may also be feasible to further determine and display the information of the UGC in the geographical range along the borderline or the periphery of the street view using an orientation relation of the street view according to the posting position of the UGC, such that the UGC displayed in the Street View may reflect the information of not only each POI in the Street View but also the different orientations on the periphery of the Street View. This information may find application in providing guidance to switching between several street views and be able to quickly find another street view or its UGC of similar interest.

It may also be feasible to divide the peripheral region located in the geographical range of the street view, from the peripheral region externally into more than one peripheral sub-range according to a relation corresponding to an orientation of the street view, and determining UGC posted from each of the plurality of peripheral sub-range. More specifically, each peripheral sub-range may be matched to the posting information of the UGC found and displayed according to an orientation relation between each peripheral sub-range which corresponds to the street view.

Figure 3:
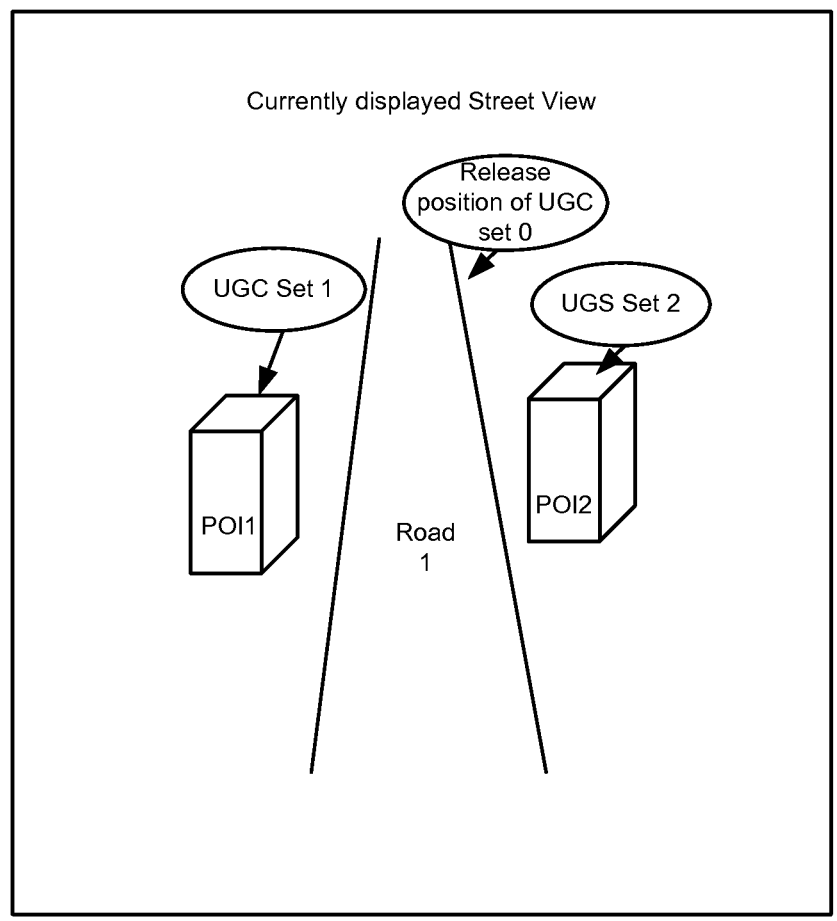
FIG. 3 shows a diagram depicting an exemplary browser displaying corresponding UGC posted at various point of interest (POI) in a street view, according to an embodiment of the present disclosure.

FIG. 3 shows a diagram depicting an exemplary browser displaying corresponding UGC broadcasted at various point of interest (POI) in a street view, according to an embodiment of the present disclosure. More specifically, FIG. 3 illustrates an example on how to display the UGC corresponding to the POI in the street view, or the sub-range of the geographical range of the street view corresponds. An association relation between the UGC and the POI or sub-range may be indicated through arrows and bubbles in FIG. 3.

As shown in FIG. 3, the browser discloses a street view which may include road 1, building 1 (i.e., as POI 1) and building 2 (i.e., as POI 2), respectively on each side of the road 1. UGC set 1 points to the POI 1 via an arrow represents that the UGC set 1 has been posted in proximal to the POI 1. Likewise, UGC set 2 points to the POI 2 via an arrow represents that the UGC set 2 has been posted proximal to the POI 2 (i.e., building). A UGC set 0 may also be displayed in the street view, which points to an area in the street view via an arrow. Information of the specific posting position of the UGC set 0 may also be displayed, wherein the information of the posting position may include the information of the latitude and longitude or information of the orientation and/or distance of the geographic reference position relative to the street view.

Figure 4:
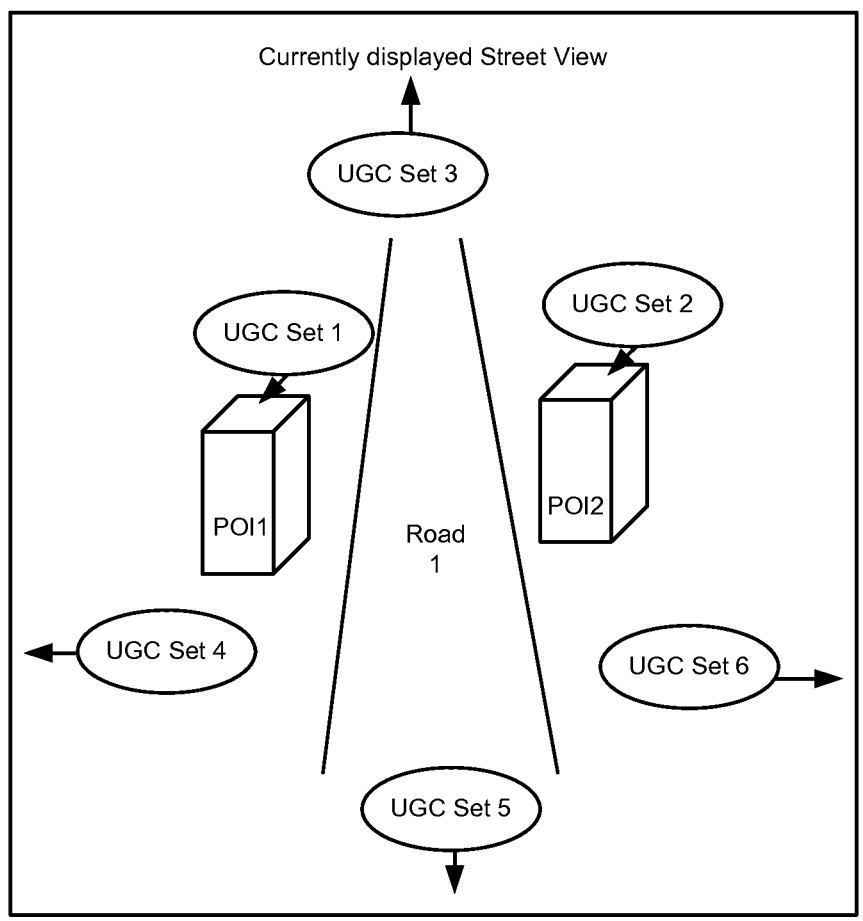
FIG. 4 shows a diagram depicting an exemplary browser displaying corresponding UGC posted at various point of interest (POI) in a street view, according to another embodiment of the present disclosure.

FIG. 4 shows a diagram depicting an exemplary browser displaying corresponding UGC broadcasted at various point of interest (POI) in a street view, according to another embodiment of the present disclosure.

FIG. 4 illustrates that the displaying of the one or more first respective UGC posted from each of the plurality of POI which are present at the street view and the one or more second respective UGC posted within the predefined range measured from the geographical location information of the street view, may include: determining on the browser, a first display position for the one or more respective first UGC and a second display position the one or more respective second UGC, wherein the first display position represents a posting location of the POI at the street view, and the second display position represents a posting location within the predefined range measured from the POI at the street view.

Similar to FIG. 3, FIG. 4 also displays the UGC set 1 and UGC set 2 of the corresponding POI 1 and POI 2 in the street view, except that the browser in FIG. 4 further displays UGC set 3 to UGC set 6, which with arrows pointing to relative orientations which are to the front, left, rear or right of the street view of the street view.

FIG. 4 illustrates that it may be feasible to determine a second display position of the UGC which may represent a posting location within the predefined range measured from the POI at the street view. The first display position may represent a posting location of the POI at the street view. The second display position may refer to one type of position, such as the position slightly in the front, to the left or to the right of the first display position. In effect, the determination of the second display position may provide a visual effect for the first display position, which the second display position may reflect a corresponding relation between the displayed content of the first display position and the displayed content of the second display position by scrolling with a finger to view the UGC, by following a direction of the arrow. Accordingly, a corresponding relation between the POI and the UGC may intuitively be determined according to only the display positions of the POI and the UGC set without a need of displaying the entire UGC on the display interface.

Furthermore, the determining of the second display position of the UGC within the predefined range measured from the POI may include determining the second display position of the UGC according to the first display position, utilizing a three-dimensional (3D) display effect and a visual scaling characteristic of the street view. The utilizing of the 3D display effect and the visual scaling characteristics to determine the second display position of the UGC within the predefined range measured from the POI, which may include: determining information of a distance and an orientation between the geographical location information of the POI and a geographical reference location of the street view; subtracting a preset value from the distance in order to obtain a display distance of the UGC, and determining the second display position of the UGC, according to the visual scaling characteristics of the visual display effect of the street view and information of the orientation and the display distance of the UGC.

More specifically, the browser may display the street view with a three-dimensional (3D) display effect, which may provide a virtual presence feeling at the street view at the time of viewing. However, displaying the street view with 3D display effect on a planar display interface requires the POI at distance be scaled down visually. For example, a nearby object should appear bigger relative to a faraway object of the same size. Two objects which are relatively close to each other may result in the object in the front blocking the object in the rear. Accordingly, it may be necessary to consider utilizing 3D display effect with visual scaling characteristic to correlate between the displayed UGC of the first display position and the second display position.

As an example, the information of distance and orientation between the geographic position of the POI and the geographic reference position of the street view may be determined by subtracting a preset value on the basis of the distance so as to acquire the display distance of the UGC and to determine the second display position of the UGC, which has been posted in the preset range around this POI in the street view, according to the visual scaling characteristic of the visual display effect of the street view, the information of the orientation and the display distance of the UGC.

The geographic reference position of the street view is generally the position nearest to the street view. Therefore, a value of the preset value is generally greater than 0 in order to direct the UGC set towards a POI, and to display in front of another POI according to the 3D display effect of the street view.

In addition, the display effect of the street view also may have the visual scaling characteristic, therefore, after having determined the display distance of the UGC, it may be necessary to determine the second display position of the UGC in the street view according to the display distance of the UGC and the orientation relation between the geographic position of the POI which corresponds to the UGC, and to the geographic reference position on the basis of the visual scaling characteristic. The UGC set which directs towards one POI may be displayed in front of another POI; which may also be displayed exactly on the another POI or displayed in a position slightly to the left or to the right of the another POI, provided that the corresponding another UGC set of the another POI may be determined to correspond to each other according to the display position of the one POI and the corresponding display position of the UGC.

The preset value may be a fixed value. Preferentially, the preset value may be the value which has been acquired according to the information, such as a distance among the various POIs in a pending street view, in order to ensure that when two POIs are relatively close to each other, a first UGC set which correspond to a faraway POI may not appear in front of a nearby POI to result in a display error.

Figure 5:
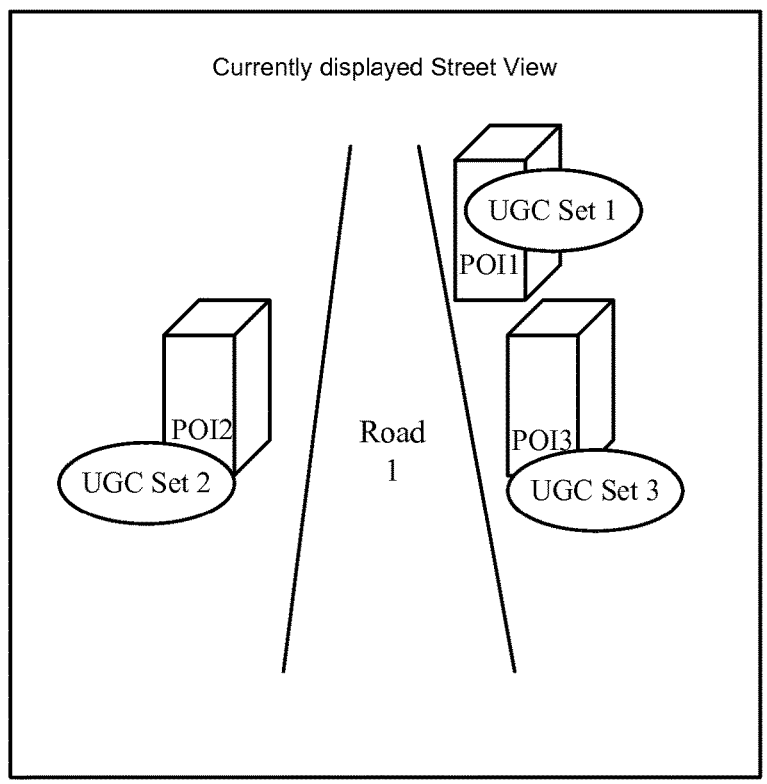
FIG. 5 shows a diagram depicting an exemplary browser displaying corresponding UGC posted at various point of interest (POI) in a street view, according to yet another embodiment of the present disclosure.

FIG. 5 shows a diagram depicting an exemplary browser displaying corresponding UGC broadcasted at various point of interest (POI) in a street view, according to yet another embodiment of the present disclosure. More specifically, FIG. 5 illustrates a display of a UGC which has been posted in the vicinity of a POI, and a determination of the second display position according to the first display position.

As shown in FIG. 5, the street view may include road 1, building 1 (i.e., a POI 1) on one side of road 1, where building 2 (i.e., a POI 2) and building 3 (i.e., a POI 3) on the other side of road 1. UGC sets 1-3 are displayed in front of POI 1-3, respectively. Furthermore, POI 3 is relatively close to POI 1. UGC set 1 is therefore displayed in a position in front of POI 1 to avoid being displayed in front of POI 3 to avoid being misunderstood that UGC set 1 corresponds to POI 3.

It may be seen from FIG. 5 that the UGC sets 1-3 are located slightly in front of POIs 1-3, respectively, to visually provide intuitive understanding that UGC set 1 is directed towards POI 1, UGC set 2 is directed towards POI 2, and UGC set 3 is directed towards POI 3, respectively.

According to the present disclosure, it is feasible to determine a display order of the UGC according to the posting time, the heat and/or the relevancy of the UGC at the time of displaying the posted UGC within the geographical range. A priority may be given to first display the UGC which is posted earlier, with higher heat and/or with greater relevance within the geographical range.

It may also be feasible to first display abstract information of the UGC within the geographical range, and then displaying the detailed information of the UGC only after receiving a browsing command on the specific UGC. The abstract information may display the content of the UGC pre-arranged to be shown as the first position for viewing, or pre-arranged to be shown at the first few positions to be viewed by scrolling down.

In order to prevent the displayed information of the UGC from blocking the POI in the Street View, a partially transparent or fully transparent floating layer, or a floating layer with adjustable transparency may be used to display the UGC.

Figure 6:
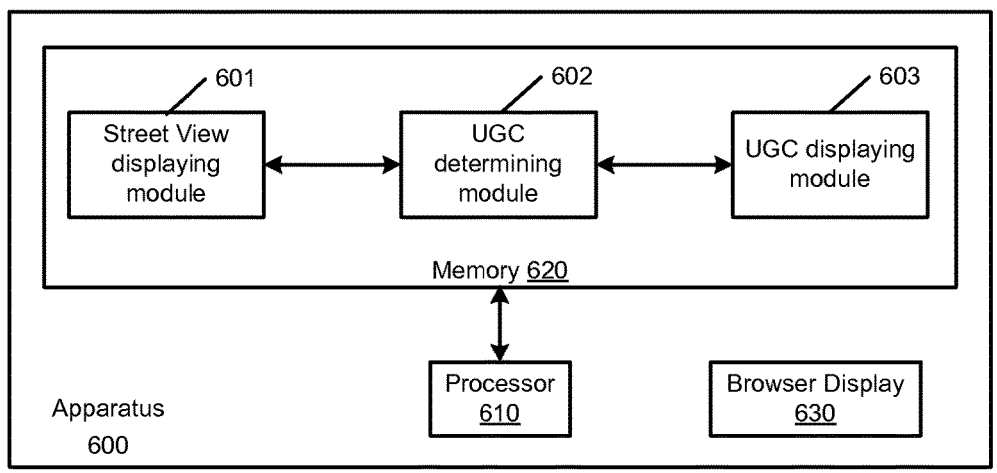
FIG. 6 illustrates an exemplary structural schematic diagram of a UGC displaying apparatus, according to yet another embodiment of the present disclosure.

FIG. 6 illustrates an exemplary structural schematic diagram of a UGC displaying apparatus, according to an embodiment of the present disclosure. As shown in FIG. 6, the UGC apparatus (600) (which may also be referred to as a user's terminal herein after) may include at least a processor (610) operating in conjunction with at least a memory (620) which stores instruction codes operable as plurality of modules, wherein the plurality of modules may include: a street view displaying module (601), a UGC determining module (602) and a UGC displaying module (603).

The street view displaying module (601) may display on a browser (630) of a user's terminal (600), a street view.

The UGC determining module (602) may determine a geographical range within which the street view lies, and determines a plurality of UGC which have been posted within the geographical range information of UGC, wherein the geographical range includes geographical location information of the street view and a surrounding area covered within a predefined range measured from the geographical location information of the street view.

The UGC determining module (602) may also determine a plurality of point of interest (POI) which are present at the street view and each of the plurality of POI's corresponding geographical location information; and determine one or more first respective UGC posted from each of the plurality of POI which are present at the street view and one or more second respective UGC posted within the predefined range measured from the geographical location information of the street view.

The UGC displaying module (603) may display on the browser (630), the plurality of UGC posted within the geographical range of the street view. The UGC displaying module (603) may also display the one or more first respective UGC posted from each of the plurality of POI which are present at the street view and the one or more second respective UGC posted within the predefined range measured from the geographical location information of the street view.

The UGC displaying module (603) may sort the plurality of UGC according to categories and according to mutual distance separations of the plurality of UGC from each other, wherein the mutual distance separations are based on measured distances from the geographical location information of the street view, such that sorted same category of UGC each corresponds to a respective sub-range within the geographical range, and to display the UGC posted within the geographical range based on a relation corresponding between the sorted same category of UGC and the respective sub-range within the geographical range.

The UGC displaying module (603) may determine on the browser, a first display position for the one or more respective first UGC and a second display position the one or more respective second UGC, wherein the first display position represents a posting location of the POI at the street view, and the second display position represents a posting location within the predefined range measured from the POI at the street view.

The UGC displaying module (603) may determine the second display position of the UGC according to the first display position, utilizing a three-dimensional display effect and a visual scaling characteristic of the street view.

The UGC displaying module (603) may determine information of a distance and an orientation between the geographical location information of the POI and a geographical reference location of the street view, subtract a preset value from the distance in order to obtain a display distance of the UGC, and determine the second display position of the UGC, according to the visual scaling characteristics of the visual display effect of the street view and information of the orientation and the display distance of the UGC The UGC determining module (602) may acquire information of geographical reference location of the street view, and determining the range measured from the geographical location information of the street view, according to the information of the geographical reference location and information of a relation between a borderline of a geographical range and the information of the geographical reference location.

The UGC displaying module (603) may divide a region which are externally located to and surrounding the geographical range of the street view into a plurality of peripheral sub-ranges, according to a relation corresponding to an orientation of the street view, and determine UGC posted from each of the plurality of peripheral sub-range; and display the UGC posted from each of the plurality of peripheral sub-range according to an orientation relation corresponding between the street view and each of the plurality of peripheral sub-range.

The UGC displaying module (603) may determine an order of displaying of the UGC within one geographical range, which order of displaying follows one or more of: posting time, heat, relevancy of the UGC, a corresponding relation to the POI within the one geographical range, wherein the UGC displaying module (603) may first display an abstract information of the UGC to be posted, afterwards display detailed information of the UGC within the one geographical range upon receiving a detailed information command from the browser.

The UGC described in the embodiments of the present disclosure may include, but not limited to contents such as micro-blog posts, comments, logs, photos and videos which have been posted in the social network space.

In the embodiments of the present disclosure, displaying the UGC according to street view may be realized for example, by means of Flash, HTML5 or a graphical interface of client-side software, etc. The embodiments of the present disclosure may be applied to not only web clients of personal computers (PCs) but also applied to mobile terminals, such as mobile phones and tablet PCs; they are not limited by the display of the application terminals, so they may provide relatively extensive applications.

The steps in the various methods in the aforementioned embodiments may be completed via programs, which command corresponding hardware. Such programs may be stored in a computer-readable memory medium. The memory medium may include: flash memory disk, read-only memory (ROM), random access memory (RAM), disk or compact disk, etc.

Disclosed above are only preferred embodiments of the present disclosure and these preferred embodiments are not intended to be limiting the scope of rights of the present disclosure, hence any equivalent changes made according to the claims of the present disclosure shall fall within the scope of the present disclosure.

What is claimed is:

1. A method for searching and displaying user generated content (UGC), comprising:
   capturing a 360 degrees forward view of a street view by a user's terminal;
   displaying on a browser of the user's terminal, the captured forward view of the street view in 360 degrees;
   uploading the captured forward view of the street view in 360 degrees to a social network website to search and display relevant UGC directly related to a plurality of points of interest (POI) at the street view, wherein the user's terminal communicates with the social network website to perform operations, comprising:
      determining a geographical range according to the captured forward view of the street view in 360 degrees, wherein the geographical range comprises geographical location information of the captured forward view of the street view in 360 degrees and a surrounding area covered within a predefined range measured from the geographical location information of the captured forward view of the street view in 360 degrees;
      determining a plurality of UGC which have been posted within the geographical range; and
      displaying on the browser, the plurality of UGC posted within the geographical range according to the captured forward view of the street view in 360 degrees, wherein the displaying of the plurality of UGC posted within the geographical range, comprising:
         sorting the plurality of UGC according to subject categories into sorted same subject category of UGC, and according to mutual distance separations of the plurality of UGC from each other, wherein the mutual distance separations are based on measured distances from the geographical location information of the captured forward view of the street view in 360 degrees;
         displaying only the sorted same subject category of UGC which corresponds to a respective sub-range within the geographical range being visible as a partially transparent floating layer over the captured forward view of the street view, wherein visibility of the displayed sorted same subject category of UGC as the partially transparent floating layer is adjustable over a range from partially transparent to fully transparent based on user's choice.

2. The method according to claim 1:
   wherein the determining of the plurality of UGC which have been posted within the geographical range, comprising:
      determining the plurality POI which are present at the street view and each of the plurality of POI's corresponding geographical location information; and
      determining one or more first respective UGC posted from each of the plurality of POI which are present at the captured forward view of the street view in 360 degrees and one or more second respective UGC posted within the predefined range measured from the geographical location information of the captured forward view of the street view in 360 degrees, wherein the displaying of the UGC posted within the geographical range, comprising:
         displaying the one or more first respective UGC posted from each of the plurality of POI which are present at the captured forward view of the street view in 360 degrees and the one or more second respective UGC posted within the predefined range measured from the geographical location information of the captured forward view of the street view in 360 degrees.

3. The method according to claim 1, wherein the displaying of the UGC posted within the geographical range, comprising:
   displaying the UGC posted within the geographical range based on a relation corresponding between the sorted same category of UGC and the respective sub-range within the geographical range.

4. The method according to claim 2, wherein the displaying of the one or more first respective UGC posted from each of the plurality of POI which are present at the captured forward view of the street view in 360 degrees and the one or more second respective UGC posted within the predefined range measured from the geographical location information of the captured forward view of the street view in 360 degrees, comprising:
   determining on the browser, a first display position for the one or more respective first UGC and a second display position the one or more respective second UGC, wherein the first display position represents a posting location of the plurality of POI at the captured forward view of the street view in 360 degrees, and the second display position represents a posting location within the predefined range measured from the POI at the captured forward view of the street view in 360 degrees.

5. The method according to claim 4, wherein the determining of the second display position of the UGC within the predefined range measured from the POI, comprising:
   determining the second display position of the UGC according to the first display position, utilizing a three-dimensional (3D) display effect and a visual scaling characteristic of the captured forward view of the street view in 360 degrees.

6. The method according to claim 5, wherein the utilizing of the 3D display effect and the visual scaling characteristics to determine the second display position of the UGC within the predefined range measured from the plurality of POI, comprising:
   determining information of a distance and an orientation between the geographical location information of the plurality of POI and a geographical reference location of the captured forward view of the street view in 360 degrees;
   subtracting a preset value from the distance in order to obtain a display distance of the UGC, and
   determining the second display position of the UGC, according to the visual scaling characteristics of the visual display effect of the captured forward view of the street view in 360 degrees and information of the orientation and the display distance of the UGC.

7. The method according to claim 1, wherein the determining of the geographical range within which the captured forward view of the street view in 360 degrees lies, comprising:

acquiring information of geographical reference location of the captured forward view of the street view in 360 degrees, and determining the predefined range measured from the geographical location information of the captured forward view of the street view in 360 degrees, according to the information of the geographical reference location and information of a relation between a borderline of a geographical range and the information of the geographical reference location.

8. The method according to claim 1, wherein the geographical range corresponding to the captured forward view of the street view in 360 degrees is larger than the predefined range of the captured forward view of the street view in 360 degrees, and the displaying of the plurality of UGC in the captured forward view of the street view in 360 degrees corresponding to respective posting locations comprising:

dividing into a plurality of peripheral sub-ranges which are externally located to and surrounding the geographical range of the captured forward view of the street view in 360 degrees, according to a relation corresponding to an orientation of the captured forward view of the street view in 360 degrees, and determining UGC posted from each of the plurality of peripheral sub-range;

displaying the UGC posted from each of the plurality of peripheral sub-range, according to an orientation relation corresponding between the captured forward view of the street view in 360 degrees and each of the plurality of peripheral sub-range.

9. The method according to claim 1, wherein the displaying of the UGC posted within one geographical range follows an order comprising determining one or more of: posting time, heat, relevancy of the UGC, a corresponding relation to the plurality of POI within the one geographical range.

10. The method according to claim 1, wherein prior to the displaying of the UGC posted within one geographical range, first displaying an abstract information of the UGC to be posted, afterwards displaying detailed information of the UGC within the one geographical range upon receiving a detailed information command from the browser.

11. An apparatus within a user's terminal, which searches and displays user generated content (UGC), comprising at least a processor which executes instruction codes stored in at least a memory, which configures the apparatus to:

capture a 360 degrees forward view of a street view;

display on a browser of the user's terminal, the captured street view;

upload the captured forward view of the street view in 360 degrees to a social network website in order to search relevant UGC directly related to a plurality of points of interest (POI) at the street view for display, wherein the apparatus communicates with the social network website to:

determine a geographical range according to the captured forward view of the street view in 360 degrees, and determine a plurality of UGC which have been posted within a geographical range, wherein the geographical range comprises geographical location information of the captured forward view of the street view in 360 degrees and a surrounding area covered within a predefined range measured from a geographical location information of the captured forward view of the street view in 360 degrees;

determine a plurality of UGC which have been posted within the geographical range;

display on the browser, the plurality of UGC posted within the geographical range according to the captured forward view of the street view in 360 degrees; and sort the plurality of UGC according to subject categories into sorted same subject category of UGC, and according to mutual distance separations of the plurality of UGC from each other, wherein the mutual distance separations are based on measured distances from the geographical location information of the captured forward view of the street view in 360 degrees;

display only the sorted same subject category of UGC which corresponds to a respective sub-range within the geographical range being visible as a partially transparent floating layer over the captured forward view of the street view, wherein visibility of the displayed sorted same subject category of UGC as the partially transparent floating layer is adjustable over a range from partially transparent to fully transparent based on user's choice.

12. The apparatus according to claim 11, wherein the apparatus is configured to:

determine the plurality of POI which are present at the captured forward view of the street view in 360 degrees and each of the plurality of POI's corresponding geographical location information; and determine one or more first respective UGC posted from each of the plurality of POI which are present at the captured forward view of the street view in 360 degrees and one or more second respective UGC posted within the predefined range measured from the geographical location information of the captured forward view of the street view in 360 degrees;

display the one or more first respective UGC posted from each of the plurality of POI which are present at the captured forward view of the street view in 360 degrees and the one or more second respective UGC posted within the predefined range measured from the geographical location information of the captured forward view of the street view in 360 degrees.

13. The apparatus according to claim 12, wherein the apparatus is configured to:

determine on the browser, a first display position for the one or more respective first UGC and a second display position the one or more respective second UGC, wherein the first display position represents a posting location of the plurality of POI at the captured forward view of the street view in 360 degrees, and the second display position represents a posting location within the predefined range measured from the plurality of POI at the captured forward view of the street view in 360 degrees.

14. The apparatus according to claim 13, wherein the apparatus is configured to:

determine the second display position of the UGC according to the first display position, utilizing a three-dimensional (3D) display effect and a visual scaling characteristic of the captured forward view of the street view in 360 degrees.

15. The apparatus according to claim 14, wherein the apparatus is configured to:

determine information of a distance and an orientation between the geographical location information of the plurality of POI and a geographical reference location of the street view, subtract a preset value from the distance in order to obtain a display distance of the UGC, and determine the second display position of the UGC, according to the visual scaling characteristics of the visual display effect of the captured forward view of the street view in 360 degrees and information of the orientation and the display distance of the UGC.

16. The apparatus according to claim 11, wherein the apparatus is configured to:
acquire information of geographical reference location of the captured forward view of the street view in 360 degrees, and determine the predefined range measured from the geographical location information of the captured forward view of the street view in 360 degrees, according to the information of the geographical reference location and information of a relation between a borderline of a geographical range and the information of the geographical reference location.

17. The apparatus according to claim 11, wherein the apparatus is configured to:
divide a region which are externally located to and surrounding the geographical range of the captured forward view of the street view in 360 degrees into a plurality of peripheral sub-ranges, according to a relation corresponding to an orientation of the captured forward view of the street view in 360 degrees, and determine UGC posted from each of the plurality of peripheral sub-range; and display the UGC posted from each of the plurality of peripheral sub-range according to an orientation relation corresponding between the captured forward view of the street view in 360 degrees and each of the plurality of peripheral sub-range.

18. The apparatus according to claim 11, wherein the apparatus is configured to:
determine an order of displaying of the UGC within one geographical range, which order of displaying follows one or more of: posting time, heat, relevancy of the UGC, a corresponding relation to the plurality of POI within the one geographical range.

19. The displaying apparatus according to claim 11, wherein the apparatus is configured to:
display an abstract information of the UGC to be posted, afterwards displays detailed information of the UGC within the geographical range upon receiving a detailed information command from the browser.

* * * * *